United States Patent [19]

Filliol et al.

[11] Patent Number: 4,461,333

[45] Date of Patent: Jul. 24, 1984

[54] INTERNAL SUPPORT TO RESIST THE FLATTENING OF A TIRE

[75] Inventors: Jean-Claude Filliol, Cebazat; Bernard Ruby, Pont-du-Chateau; Jean Senechal, Mozac, all of France

[73] Assignee: Compagnie Generale des Etablissements Michelin, Clermont-Ferrand, France

[21] Appl. No.: 438,955

[22] Filed: Nov. 3, 1982

[30] Foreign Application Priority Data

Nov. 20, 1981 [FR] France ............................. 81 21933

[51] Int. Cl.³ ..................... B60C 17/00; B60C 5/00; B60C 23/06
[52] U.S. Cl. .......................... 152/158; 116/34 R; 152/330 RF; 152/330 L; 152/400
[58] Field of Search ............ 152/158, 330 RF, 330 L, 152/157, 155, 385, 399, 400, 401, 151, 152; 116/34 R, 34 A, 34 B, 67 R

[56] References Cited

U.S. PATENT DOCUMENTS

| | | | |
|---|---|---|---|
| 1,359,098 | 11/1920 | Oerke | 116/34 B |
| 3,872,907 | 3/1975 | Curtiss, Jr. et al. | 152/158 |
| 4,183,388 | 1/1980 | Cassidy | 152/158 |
| 4,295,509 | 10/1981 | Stein | 152/158 |
| 4,334,565 | 6/1982 | Stokes | 152/158 |
| 4,383,566 | 5/1983 | Houghton | 152/158 |

FOREIGN PATENT DOCUMENTS 2252227 6/1975 France .
2419188 10/1979 France .

Primary Examiner—William A. Powell
Assistant Examiner—Thomas Bokan
Attorney, Agent, or Firm—Brumbaugh, Graves, Donohue & Raymond

[57] ABSTRACT

A support fastened to a wheel rim within a tire cavity to resist the flattening of the tire in the case of a blow-out is formed of an elastic radial support element arranged between the equatorial plane of the tire and the outside sidewall of the tire and of an elastic axial holding element arranged between the radial support element and the outside sidewall of the tire. A terminal annular protuberance of the axial holding element has a developed circumferential length greater than that of the periphery of the radial support element and is located axially towards the outside with respect to the connection of the axial holding element to the radial support element.

23 Claims, 6 Drawing Figures

INTERNAL SUPPORT TO RESIST THE FLATTENING OF A TIRE

The present invention relates to a support arranged on the wheel rim on the inside of tires for vehicles. This support is intended to resist, upon a drop in inflation pressure, the crushing of the tire which might result in damage to it and interfere with the maneuveravility of the vehicle.

Numerous safety supports have been devised since the first pneumatic tires were placed on the market. When the tire loses pressure, they, for instance the one described in French Pat. No. 2,252,227, constitute, on the one hand, an elastic radial support for the crown of the tire with or without the interposition of lubricant, by means of a ring which is of a diameter less than the inside diameter of the tire and is fixed or movable in rotation and, on the other hand, a quasi-rigid axial holding of the beads as well as of the parts of the sidewalls immediately adjacent to the beads.

In the arrangement described in French Pat. No. 2,419,188, the radial support ring is without attachment to the rim and is extended axially on both sides up to the middle of the sidewall by two flexible wings which are applied against the wall of the tire and intended to come between the upper and lower halves of the corresponding sidewall when the tire is completely deflated.

With tires whose sidewalls are very flexible, such as radial tires with reinforced crown, the known supports lack progressivity and show insufficient roadholding properties as compared with tires inflated to their service pressure. The vehicle responds very poorly to the actions of the driver. The drop in or absence of inflation pressure, as a matter of fact, exaggerates the flexibility of the sidewalls and hence produces insufficient transverse stiffness of the tire.

The object of the present invention is to provide an internal support which, whatever the degree of flattening of the tire in case of a drop in or absence of inflation pressure, is capable of making up for the lack of transverse stiffness of the tire without impairing the support of the crown and the holding in place of the beads and which can be easily installed in and cooperate with tires and wheels which are in accord with the standards in force.

The solution in accordance with the invention consists of a support arranged within the inflatable cavity of a tire comprising a crown having a tread extended on each side by a sidewall terminating in a bead mounted on a corresponding seat of a wheel rim for a vehicle, which support, when the tire is mounted and inflated to normal pressure, comprises, on the one hand, an elastically deformable annular element for the radial support of the crown of the tire, the radially outward periphery of which radial support element extends axially at least between the equatorial plane of the tire and that sidewall of the tire arranged toward the outside of the vehicle over a width less than that of the inflatable cavity at the height of the radially outward periphery of the radial support element and, on the other hand, an elastically deformable annular element for the axial holding of the sidewall at least between the radial support element and that sidewall of the tire arranged toward the outside of the vehicle, which axial holding element is connected to the radial support element and the radially outward periphery of which axial holding element has a developed length in the circumferential direction greater than the developed length in the circumferential direction of the radially outward periphery of the radial support element but less than the developed length in the circumferential direction of the radially facing portion of the inside of the tire, characterized by the fact that:

the support comprises a device for fastening the radial support element to the wheel rim, the radial support element which contacts the inside of the crown of the tire only when deflated or uninflated, has a radially inward lateral extension near the bead of that sidewall arranged toward the outside of the vehicle, the axial holding element which contacts the inside of the axially outer sidewall of the tire only when deflated or uninflated to provide transverse stiffness of the deflated or uninflated tire, is formed essentially of a flexible ring and of a terminal annular protuberance radially outward of the ring and integral with it, the ring being provided at its radially inner end with a connection to the lateral extension of the radial support element, and the terminal annular protuberance being staggered axially toward the corresponding sidewall of the tire with respect to the connection of the ring to the lateral extension of the radial support element so that its axially outer surface is at a distance from the equatorial plane of the tire greater than half-width of the rim but less than the maximum axial half-width of the inside of the tire.

The connection between the annular axial holding element and the annular radial support element may be effected in various ways. For this purpose, the radial support element has a radially inward lateral extension near the bead of that sidewall arranged toward the outside of the vehicle. The radial support element and its radially inward lateral extension preferably constitute a single elastically deformable piece, made preferably by molding. In a first variant, the flexible ring of the axial holding element is implanted in the lateral extension of the radial support element. In another variant, the flexible ring of the axial holding element is connected to the lateral extension of the radial support element by an articulation. This articulation may be formed, on the one hand, of a circumferential groove of a semi-circular radial cross-section open radially toward the outside in the radially inward lateral extension of the radial support element, and, on the other hand, of the radially inner end of the flexible ring of the axial holding element, which end fits the semi-circular profile of the groove and embeds itself in the groove due to the elasticity of the axial holding element and in particular of the inner ring of that element.

One essential feature of the support in accordance with the invention—the tire being mounted and inflated to its normal pressure—is the axial stagger of the terminal annular protuberance of the axial holding element toward the corresponding sidewall of the tire with respect to the connection of that element to the radial support element.

The developed length in the circumferential direction (or the diameter with respect to the axis of rotation of the wheel) of the radially outward periphery of the terminal annular protuberance of the axial holding element is greater than that of the radially outward periphery of the radial support element. In case of a drop in or absence of inflation pressure, the inside of the shoulder of the tire exerts a pressure on the radially outward periphery of the terminal annular protuberance of the axial holding element before the inside of the crown of the tire comes against the radially outward periphery of the radial support element. Due to the axial stagger pursuant to the invention between the terminal annular protuberance of the axial holding element and the connection of that element to the radial support element, the uncoupling movement of the terminal annular protuberance of the axial holding element under the effect of the pressure from the inside of the tire is at all times directed towards the outside of the vehicle. Thus, the outside sidewall is held axially and the lateral stiffness of the uncoupled axial holding element makes up for the lack of stiffness of the sidewall and imparts to the tire sufficient road-holding capacity while moderating the flexure of the sidewall. In practice, with the vehicle proceeding along a straight path, it is sufficient that the support in accordance with the invention can act on the interior wall of the tire included approximately between the sidewall arranged on the outer side of the vehicle and the equator of the crown of the tire. However, the invention also includes the case that with the radial support element there is associated toward the other sidewall of the tire arranged on the inward side of the vehicle a second axial holding element constructed and arranged in similar manner, for instance symmetrical with respect to the equatorial plane of the tire, to the first axial holding element.

In accordance with another variant of the invention, the radial support element has a radially outward flexible axial extension extending in the direction towards that sidewall of the tire arranged toward the inside of the vehicle. This extension elastically supports the crown of the tire up to the level of the edge of the tread of the tire arranged toward the inside of the vehicle. The radial support element and the flexible axial extension may both have cylindrical radially outward peripheries and equal developed lengths in the circumferential direction. The invention also contemplates combining a radially outward periphery of the cylindrical radial support element with a flexible axial extension having on the outside the shape of a frustoconical ring whose diameter increases in the direction towards the inner sidewall of the tire. Thus, the free end portion of the frustoconical axial extension has a developed length in the circumferential direction greater than the developed length in the circumferential direction of the cylindrical radially outward periphery of the radial support element at the level of the equatorial plane of the tire, when the tire is inflated to its normal pressure.

The elastically deformable component elements of the support in accordance witht he invention are made preferably with a flexible material, such as a polyurethane elastomer, a thermoplast of elastomeric character or a silicone elastomer which are injected in the form of a liquid mixture into the mold, or a conventional elastomer worked by the customary processes.

In order to stiffen the axial holding element, there can be incorporated within it at least one circumferential reinforcement, for instance, a wire such as those used in the reinforcement of beads of tires, preferably arranged within the terminal annular protuberance. Likewise, one can incorporate at least one circumferential reinforcement which stiffens the radial support element, also in the form of a wire of the tire bead reinforcement type, preferably arranged in the portion of the radial support element contained between the equatorial plane of the tire and that sidewall of the tire arranged toward the outside of the vehicle.

In accordance with another variant of the invention, the radially inward lateral extension of the radial support element has an axially outer frustoconical face approximately parallel to the inner surface of the bead of the tire and arranged at such a distance from said surface that it rests on said surface upon a drop in or absence of inflation pressure which causes swinging of the axial holding element towards that sidewall of the tire arranged toward the outside of the vehicle.

The invention also extends to the case where the radially inward lateral extension of the radial support element has an axially outer face which fits the shape of the inner surface of the bead of the tire. Then the immobilizing of the bead mounted on the outer side of the vehicle is assured permanently whatever the pressure prevailing within the cavity of the tire.

The fastening of the support in accordance with the invention to the wheel rim, and preferably to the bottom of the rim, can be effected by any suitable device.

The support in accordance with the invention also lends itself to the arrangement in which the radial support element is connected, as known per se, in a manner movable in circumferential rotation, to the device for fastening of the radial support element to the wheel rim. Thus, the support can move in circumferential rotation on the inside of the tire practically without sliding.

As it is not customary to provide the inner surface of the crown of a tire with circumferential ribs, the invention also contemplates the case in which the radial support element has a radially outward periphery provided at least in part with parallel circumferential grooves. This considerably increases the transverse adherence between the support and the crown of the tire without interfering with the circumferential sliding between the support and the crown of the tire. The latter can be improved if the inner surface of the tire is provided with a lubricant, at least in the regions intended to come into contact with the support upon a drop in or absence of inflation pressure.

The support in accordance with the invention also makes it possible to advise the driver of the vehicle of a drop in or absence of inflation pressure in the tire or tires provided with this support. In numerous cases, as a matter of fact, particularly when the vehicle is not traveling at a relatively high speed, the support in accordance with the invention makes up for the road properties of the defective tire to such an extent that the driver does not note the drop in or absence of inflation pressure. The support can then be used as acoustic alarm. For this purpose, the terminal annular protuberance of the axial holding element has radial slits.

The following description refers to the accompanying drawing which shows various embodiments of the invention and in which.

Figure 1:
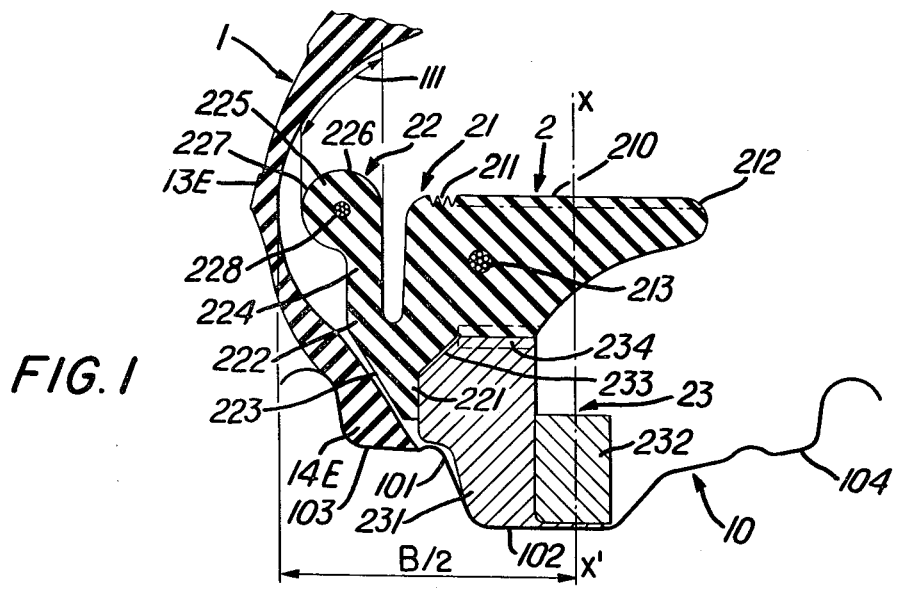
FIG. 1 shows, in radial cross-section, one main variant of the support when the tire is mounted and inflated to its normal pressure, that is to say at its service pressure.

In FIGS. 1–4, 1 is a tire (partially shown in FIGS. 1–3) mounted on a rim 10 of a wheel (the disk of which has not been shown). The tire 1 does not have an independent inner tube and forms an inflatable pneumatic cavity together with the rim 10.

Within this cavity there is mounted a support 2 (FIGS. 1 and 2) or 3 (FIGS. 3 and 4) in accordance with the invention by means of a fastening device 23. This fastening device 23 locks the support 2 on the bottom 101 of the rim 10 which is of the hollow-base type 102.

The tire 1 comprises (FIG. 4) a crown 11 having a tread 12 extended on each side by a sidewall 13 terminating in a bead 14 mounted on the corresponding seat 103, 104 of the rim 10.

Figure 2:
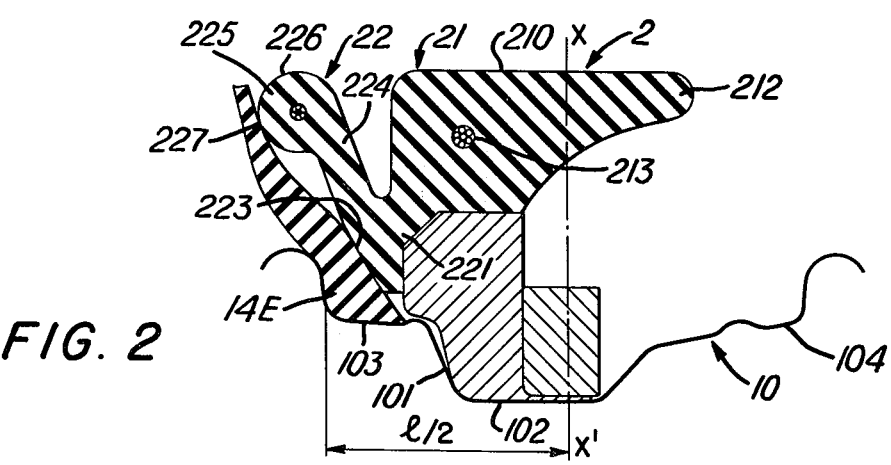
FIG. 2 is a radial cross-section through the same support as in FIG. 1, shown in action in the same tire, but uninflated.

The support 2 of FIGS. 1 and 2 comprises an annular radial support element 21 whose radially outward periphery 210 is intended to come into contact with the inside of the crown 11 of the tire 1 in case of a large drop in or the absence of inflation pressure in the tire. In this example, the element 21 as a whole is elastically deformable. It is made of a reactive mixture having a base of polyurethane, for instance, by injecting two previously mixed reactive components into a mold of suitable shape or by centrifugal or rotary casting. The radially outward periphery 210 of the element 21 has, at the location of the equatorial plane of the tire 1 of trace XX' in the drawing, a developed circumferential length (diameter multiplied by 3.14) which is less than the developed circumferential length of the inside of the crown 11 of the tire 1 when normally inflated, that is to say at its service pressure.

The support 2 of FIGS. 1 and 2 furthermore comprises an annular element 22 for the axial holding of the tire 1, the element 22 being elastically deformable and produced in the same manner as the radial support element 21.

The fastening device 23 on the rim 10 is identical for the supports 2 and 3 of FIGS. 1, 2 and 3, 4.

This fastening device 23, described with reference to FIG. 1, is formed essentially of a segment 231 and a strap 232. The segment 231 is intended to center the support 2. For this purpose, it has a frustoconical face 233 and channels 234 which fit in the inner face of the annular radial support element 21. The strap 232 locks the center segment 231 on the bottom 101 of the rim 10.

The radially outward periphery 210 of the radial support element 21 in accordance with the invention extends in axial direction between the equatorial plane (also the median plane of the seats 103 and 104 of the rim 10) of trace XX' of the tire 1 and the inside of the sidewall 13E mounted on the outward side of the vehicle (not shown) over a width less than half the width L/2 (FIG. 4) of the crown 11 of the tire 1.

The radial support element 21 furthermore contains a wire 213 of, for intance, metal. This annular wire 213 is of the type customarily used to reinforce the beads of tires. The wire 213 serves as a circumferential reinforcement for the radial support element 21. It substantially improves the seat of the element 21 on the centering segment 231 of the device 23 for fastening to the rim 10.

The wire 213 is arranged in the portion of the radial support element 21 contained between the equatorial plane of trace XX' and that sidewall 13E of the tire 1, arranged toward the outside of the vehicle.

The axial holding element 22 of the support 2 in accordance with the invention is in this example integral with the annular radial support element 21 and is arranged axially between the annular radial support element 21 and that sidewall 13E arranged toward the outside of the vehicle.

The axial holding element 22 is elastically deformable. In this example (FIGS. 1 and 2) it is formed of a radially inner ring 224 and of a terminal annular protuberance 225 of practically circular radial crosssection. The radially inner ring 224 is flexible and is implanted in the lateral extension 221 of the radially inward part of the radial support element 21. The terminal annual protuberance 225 is staggered axially towards the outside of the vehicle with respect to the connection 222 of the radially inner ring 224 of the axial holding element 22 to the radially inward lateral extension 221 of the radial support element 21.

In accordance with the invention, the radially outward surface or periphery 226 of the terminal annular protuberance 225 has a developed circumferential length greater than that of the radially outward periphery 210 of the radial support element 21 but less than the developed circumferential length of the radially facing portion 111 of the inside of the tire 1. The purpose of these arrangements is, in case of a drop in or absence of inflation pressure, to bring the inside of the tire 1 first of all into contact with the rounded radially outer face 226 of the annular protuberance 225 before the tire comes into contact with the periphery 210 of the radial support element 21. Thus, the axial holding element 22 is at all times uncoupled axially towards the outside of the vehicle (FIG. 2)

The frustoconical face 223 of the radially inward lateral extension 221 of the radial support element 21 is spaced from the inner surface of the bead 14E when the tire 1 is normally inflated. Upon the flexing of the ring 224, the face 223 is applied against the inner surface of the bead 14E located on the outer side of the vehicle. Thus, the bead 14E is locked on its seat 103 on the rim 10 (FIG. 2). The flexing of the ring 224 of the axial holding element 22 towards the outside of the vehicle then brings the axially outer surface 227 of the terminal annular protuberance 225 into contact with the inside of the corresponding sidewall 13E of the tire 1. For this purpose, the axially outward surface 227 of the annular protuberance 225 is arranged, when the tire 1 is normally inflated, at a distance from the equatorial plane (of trace XX') of the tire 1 which is greater than half the width 1/2 (measured in accordance with the customary standards) of the rim 10, but less than the maximum axial half-width B/2 of the inside of the tire 1 (FIG. 1).

The protuberance 225 remains resting permanently via its two radially (226) and axially (227) outward surfaces against the inside of the sidewall in the zone of the tire involved in contact with the ground (FIG. 2). This whatever the degree of flexing of the sidewall as a result of a drop in inflation pressure and/or movements of the vehicle with respect to the ground. At the same time the crown 11 of the tire 1 is supported by the radial support element 21 along the region of the tire involved in contact with the ground.

The protuberance 225 can be stiffened by means of a circumferential reinforcement 228, preferably a wire of the tire bead reinforcement type. This also makes it possible to adjust the developed circumferential length of the radially outward periphery 226 of the protuberance 225.

The axial movements of the crown 11 can be braked by arranging parallel circumferential grooves 211 in the radially outward periphery 210 of the annular radial support element 21.

The radial support element 21, particularly in the event that its cylindrical radially outward periphery 210 is arranged in that half of the tire 1 located on the outside of the vehicle with respect to the equatorial plane of trace XX', may, in accordance with the invention, be equipped in the other half with a flexible axial extension 212 directed towards the inside of the vehicle. This axial extension 212 increases the bearing surface of the radial support element 21. It has the same developed circumferential length as the radially outward periphery 210 of the radial support element 21 and a trapezoidal radial cross-section of an axial width at most equal to that of the radially outward periphery 210 of the radial support element 21. Hence there is degressive pressure on the inner surface of the crown 11 in the direction towards the sidewall opposite the outward side of the vehicle in case of a blow-out.

Figure 3:
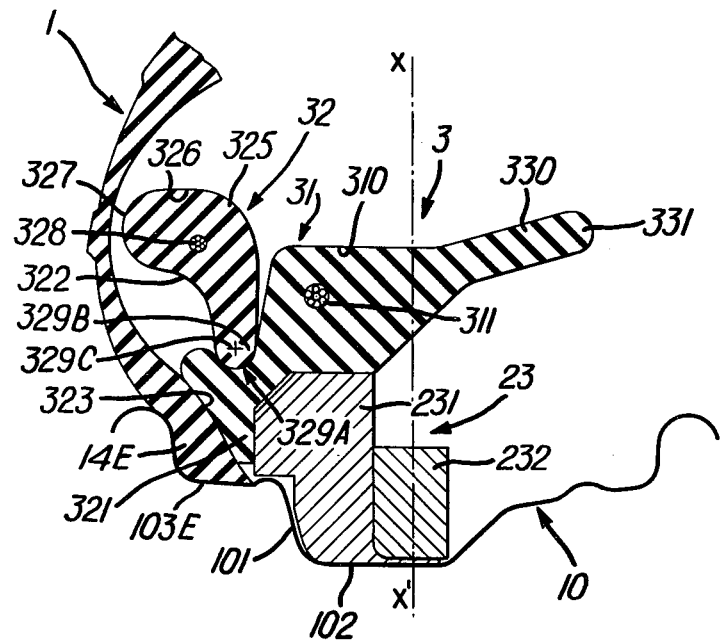
FIG. 3 shows in radial cross-section another main variant of the support when the tire is mounted and inflated to its normal pressure.
Figure 4:
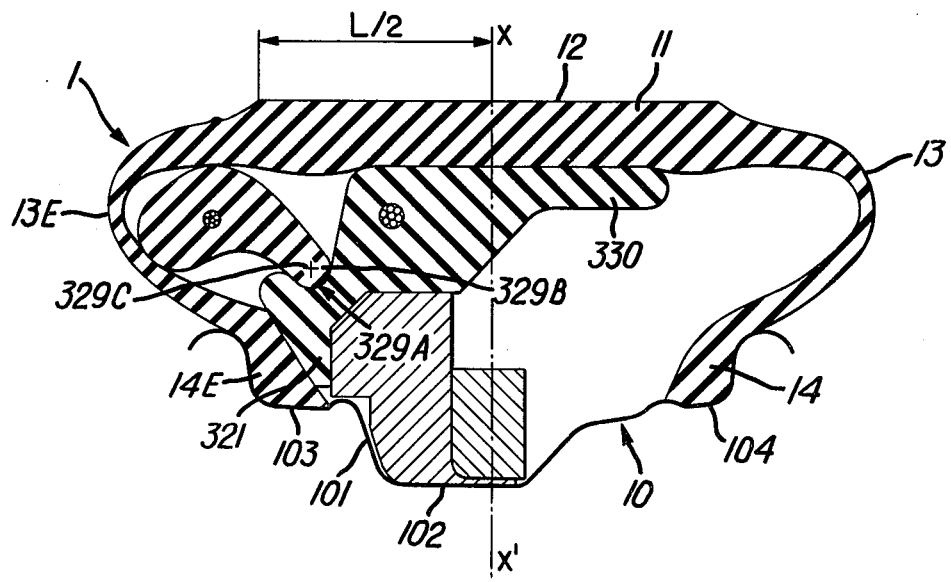
FIG. 4 is a radial cross-section through the same support as in FIG. 3, shown in action in the same tire, but uninflated.

The support 3 of FIGS. 3 and 4 is fastened to the rim 10 by means of the same device 23 as used in cooperation with the support 2 of FIGS. 1 and 2.

This support 3 differs from the support 2 of FIGS. 1 and 2 essentially by its axial holding element 32 and the axial extension 330 of the radially outward periphery 310 of the annular radial support element 31.

In this variant, the radial support element 31 forms a single piece with the radially inward lateral extension 321 of the radial support element 31. The axially outward face 323 of the radially inward lateral extension 321 fits the substantially frustoconical shape of the inner surface of the bead 14E located on the outer side of the vehicle and rests permanently against that bead. The inner ring 322 of the axial holding element 32 is connected to the radially inward lateral extension 321 of the radial support element 31 by means of an articulation 329 A, B. For this purpose, on the one hand, the radially inward lateral extension 321 is provided on its radially outward face with a circumferential groove 329A of semicircular radial cross-section open radially toward the outside; on the other hand, the radially inner end 329B of the inner ring 322 of the axial holding element 32 fits the semi-circular profile of the groove 329A and embeds itself in the groove 329A. The ring 322 of the axial holding element 32 is provided at its radially outward end with a terminal annular protuberance 325 which is shifted axially towards the outside with respect to the ring 322 and the articulation 329 A, B. This terminal annular protuberance 325 has a practically elliptical radial cross-section, the major axis of which is directed parallel to the axis of rotation (not shown) when the tire 1 is normally inflated (FIG. 3).

The radial support element 31 and the terminal annular protuberance 325 of the axial holding element 32 also contain, as circumferential reinforcements, annular metal wires 311 and 328, respectively.

The cylindrical radially outward periphery 310 of the radial support element 31 is located essentially on the side of the equatorial plane of trace XX' which is directed towards the outside of the vehicle. The radial support element 31 of the invention is provided with a radially outward flexible axial extension 330 arranged toward the inside of the vehicle. The free end portion 331 of this axial extension 330 has a greater developed circumferential length than the developed circumferential length of the cylindrical radially outward periphery 310 of the radial support element 31 to which the radially outward surface of this axial extension 330 is connected. On the one hand, this flexible axial extension 330, which forms a frustoconical zone of constant thickness, makes it possible to decrease the pressure between the radial support element 31 and the inner surface of the crown 11 of the tire 1. On the other hand, this axial extension 330, if its developed circumferential length is selected suitably with respect to the developed circumferential length of the cylindrical radially outward periphery 310 of the radial support element 31, makes it possible to produce constant pressure of the tire 1 from one axial end to the other of the radial support element 31 when the tire 1 is deflated and rests in the region involved in contact of the tire 1 with the ground.

The developed length in circumferential direction of the radially outward surface 326 of the terminal annular protuberance 325 of the axial holding element 32 is greater than that of the cylindrical radially outward periphery 310 of the radial support element 31 but also greater than that of the free-end portion 331 of the frustoconical radially outward axial extension 330 of the radial support element 31.

The axial holding element 32 of the support 3 of FIGS. 3 and 4 operates in the manner which has been described for the axial holding element 22 of the support 2 of FIGS. 1 and 2 when the tire 1 is deflated and touches the radially outward surface 326 of the terminal annular protuberance 325 of the axial holding element 32. This axial holding element 32 inclines always laterally towards the outside sidewall of the vehicle in the articulation 329 A, B and bends until the axially outward surface 327 of the terminal annular protuberance 325 applies itself against the inner surface of the sidewall 13E (FIG. 4) due to the stagger towards the outside of the terminal annular protuberance 325 with respect to the articulation 329 A, B of axis 329C. The crown 11 of the tire 1 applies itself against the radial support element 31 after having made contact with and deformed the radially outward axial extension 330. The two applications are present permanently in the region of the tire involved by contact of the tire with the ground.

Figures 5, 6:
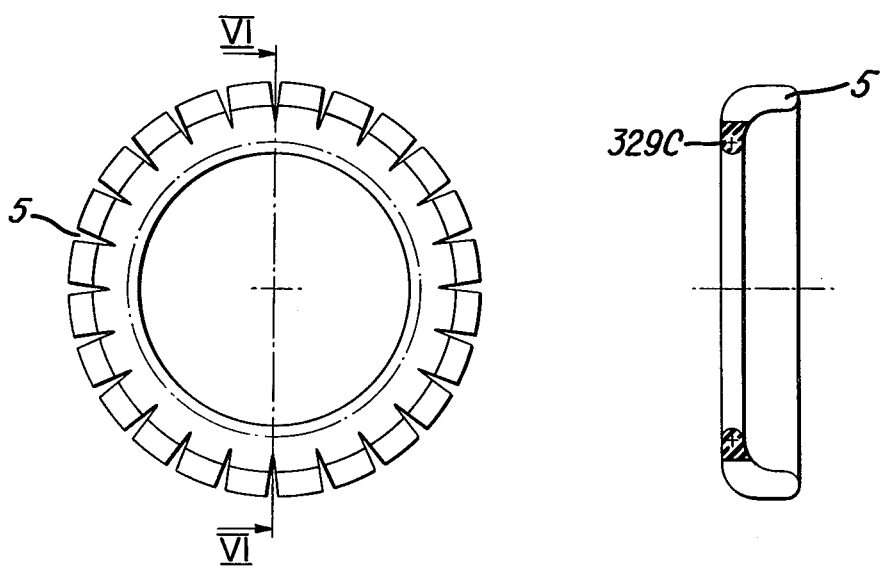
FIGS. 5 and 6 are axial and radial views (along the line VI of FIG. 5) of the terminal annular protuberance of the axial holding element provided with radial slits in order to acoustically advise the driver of a drop in or absence of inflation pressure.

As shown in FIGS. 5 and 6, the inner ring 322 of the axial holding element 32 and in particular the terminal annular protuberance 325 of this inner ring 322 may be provided with radial slits 5. The radial slits 5 produce a whistling noise which gives notice that the tire 1 is in contact with the terminal annular protuberance 325 as a result of a drop in or absence of the inflation pressure. In this variant, it is of interest to bring the wire 328 of the terminal annular protuberance 325 close to the axis 329C of the articulation 329 A, B.

The application of a lubricant to the regions of the inner surface of the tire which are called upon to enter into contact with the support in accordance with the invention and/or to the parts of said support which are called upon to enter into contact with the tire, although not indispensable, favors the operation of this support.

The arrangement in which at least the radial support element 21, 31 is free in circumferential rotation with respect to the fastening device 23 has not been shown in the drawing.

Nor has there been shown an arrangement intended to compensate for the sliding between the radial support element 21, 31 and the inner wall of the tire. The arrangement consists in providing on the radially outward periphery 210, 310 of the radial support element 21, 31 radial narrow ribs which are flexible under the effect of the pressure exerted on them by the tire.

A support with an articulated axial holding element as shown in FIGS. 3 and 4 was mounted in the cavity of a tire of size 145 R 13 arranged on a rim of size 4½J 13.

At the level of tis intersection with the equatorial plane of trace XX' this tire has an inner developed circumferential length of 168 cm. The inner maximum axial width is 14.5 cm. The radially outward periphery of the radial support element has a developed circumferential length of 138 cm and an axial width of 3.5 cm, measured from the equatorial plane of trace XX' in direction towards the outside of the vehicle. Its radially outward axial extension is cylindrical, of the same radius, and has an axial width of 1.7 cm. The articulation axis of the axial holding element is arranged axially 4.5 cm from the equatorial plane of trace XX' towards the outside and radially 21.5 cm from the axis of rotation of the tire. The terminal annular protuberance of the axial holding element has a substantially elliptical radial cross-section.

When the tire is inflated to its normal pressure, the radially outer face of the terminal annular protuberance of the axial holding element has a developed circumferential length of 147 cm and the axially outer face is located axially 6.9 cm from the equatorial plane of trace XX'. The terminal annular protuberance extends axially over a distance of 3.0 cm.

Upon the complete flattening of the tire on the radial support element and in the region involved by contact of the tire with the ground, the axially outer face of the radial holding element in contact with the outside sidewall of the tire is now located axially 8.7 cm from the equatorial plane of trace XX'.

What is claimed is:

1. A support arranged within the inflatable cavity of a tire comprising a crown having a tread extended on each side by a sidewall terminating in a bead mounted on a corresponding seat of a wheel rim for a vehicle, which support, when the tire is mounted and inflated to its normal pressure, comprises, on the one hand, an elastically deformable annular element for the radial support of the crown of the tire, the radially outward periphery of which radial support element extends axially at least between the equatorial plane of the tire and that sidewall of the tire arranged toward the outside of the vehicle over a width less than that of the inflatable cavity at the height of the radially outward periphery of the radial support element, and, on the other hand, an elastically deformable annular element for the axial holding of the sidewall at least between the radial support element and that sidewall of the tire arranged toward the outside of the vehicle, which axial holding element is connected to the radial support element and the radially outward periphery of which axial holding element has a developed length in the circumferential direction greater than the developed length in the circumferential direction of the radially outward periphery of the radial support element but less than the developed length in the circumferential direction of the radially facing portion of the inside of the tire, characterized by the fact that:

the support comprises a device for fastening the radial support element to the wheel rim, the radial support element, which contacts the inside of the crown of the tire only when deflated or uninflated, has a radially inward lateral extension near the bead of that sidewall arranged toward the outside of the vehicle, the axial holding element, which contacts the inside of the axially outer sidewall of the tire only when deflated or uninflated to provide transverse stiffness of the deflated or uninflated tire, is formed essentially of a flexible ring and of a terminal annular protuberance radially outward of the ring and integral with it, the ring being provided at its radially inner end with a connection to the lateral extension of the radial support element, and the terminal annular protuberance being staggered axially toward the corresponding sidewall of the tire with respect to the connection of the ring to the lateral extension of the radial support element so that its axially outer surface is at a distance from the equatorial plane of the tire greater than the half-width of the rim but less than the maximum axial half-width of the inside of the tire.

2. A support according to claim 1, characterized by the fact that the flexible ring of the axial holding element is implanted in the lateral extension of the radial support element.

3. A support according to claim 1, characterized by the fact that the flexible ring of the axial holding element is connected to the lateral extension of the radial support element by an articulation.

4. A support according to claim 3, characterized by the fact that the articulation is formed, on the one hand, of a circumferential groove of semi-circular radial cross-section open radially toward the outside in the radially inward lateral extension of the radial support element, and, on the other hand, of the radially inner end of the flexible ring of the axial holding element, which end fits the semi-circular profile of the groove and embeds itself in the groove.

5. A support according to claim 2, characterized by the fact that the terminal annular protuberance of the axial holding element has a substantially circular radial cross-section.

6. A support according to claim 3, characterized by the fact that the terminal annular protuberance of the axial holding element has a practically elliptical radial cross-section with major axis directed parallel to the axis of rotation of the tire, when the tire is inflated to its normal pressure.

7. A support according to claim 1, characterized by the fact that the terminal annular protuberance of the axial holding element has radial slits.

8. A support according to claim 1, characterized by the fact that the axial holding element has at least one circumferential reinforcement.

9. A support according to claim 8, characterized by the fact that the circumferential reinforcement is a wire of the tire bead reinforcement type.

10. A support according to claim 8, characterized by the fact that the circumferential reinforcement is arranged within the terminal annular protuberance of the axial holding element.

11. A support according to claim 1, characterized by the fact that the radial support element has at least one circumferential reinforcement.

12. A support according to claim 11, characterized by the fact that the circumferential reinforcement is a wire of the tire bead reinforcement type.

13. A support according to claim 11, characterized by the fact that the circumferential reinforcement is arranged in the portion of the radial support element contained between the equatorial plane of the tire and that sidewall of the tire arranged toward the outside of the vehicle.

14. A support according to claim 1, characterized by the fact that the radial support element has a radially outward flexible axial extension extending in the direction towards that sidewall of the tire arranged toward the inside of the vehicle.

15. A support according to claim 14, characterized by the fact that the radial support element has a cylindrical radially outward periphery and the flexible axial extension is externally frustoconical, the free end portion of the frustoconical axial extension has a developed length in the circumferential direction greater than the developed length in the circumferential direction of the cylindrical radially outward periphery of the radial support element at the level of the equatorial plane of the tire, when the tire is inflated to its normal pressure.

16. A support according to claim 1, characterized by the fact that at least the radially inward lateral extension of the radial support element and the radial support element constitute a single elastically deformable piece, made perferably by molding.

17. A support according to claim 2, characterized by the fact that the radially inward lateral extension of the radial support element has an axially outer frustoconical face approximately parallel to the inner surface of the bead of the tire and arranged at such a distance from said surface that it rests on said surface upon a drop in or absence of inflation pressure which causes swinging of the axial holding element towards that sidewall of the tire arranged toward the outside of the vehicle.

18. A support according to claim 3, characterized by the fact that the radially inward lateral extension of the radial support element has an axially outer face which fits the shape of the inner surface of the bead of the tire.

19. A support according to claim 1, characterized by the fact that the radial support element is connected, in a manner movable in circumferential rotation, to the device for fastening the radial support element to the wheel rim.

20. A support according to claim 1, characterized by the fact that the radial support element has a radially outward periphery provided at least in part with parallel circumferential grooves.

21. A support according to claim 1, characterized by the fact that the inner surface of the tire is provided with a lubricant, at least in the regions intended to come into contact with the support upon a drop in or absence of inflation pressure.

22. A support according to claim 14, characterized by the fact that the radial support element and the flexible axial extension both have cylindrical radially outward peripheries and equal developed lengths in the circumferential direction, the axial extension having a trapezoidal radial cross-section.

23. A support according to claim 1, characterized by the fact that the radial support element has a radially outward periphery provided with flexible radial narrow ribs.

* * * * *